(12) United States Patent
Carter et al.

(10) Patent No.: US 7,177,922 B1
(45) Date of Patent: *Feb. 13, 2007

(54) POLICY ENFORCEMENT USING THE SEMANTIC CHARACTERIZATION OF TRAFFIC

(75) Inventors: Stephen R. Carter, Spanish Fork, UT (US); Delos C. Jensen, Orem, UT (US)

(73) Assignee: Novell, Inc., Provo, UT (US)

( * ) Notice: Subject to any disclaimer, the term of this patent is extended or adjusted under 35 U.S.C. 154(b) by 584 days.

This patent is subject to a terminal disclaimer.

(21) Appl. No.: 09/654,660

(22) Filed: Sep. 5, 2000

(51) Int. Cl.
*G06F 15/173* (2006.01)
*G06F 7/00* (2006.01)
*G06F 17/30* (2006.01)

(52) U.S. Cl. .............................. 709/223; 707/3; 707/5
(58) Field of Classification Search ........ 709/201–253; 707/1–10, 100–104.1, 200–206; 704/1–10; 706/45–61
See application file for complete search history.

(56) References Cited

U.S. PATENT DOCUMENTS

| | | | | |
|---|---|---|---|---|
| 5,276,677 A * | 1/1994 | Ramamurthy et al. | ...... | 370/232 |
| 5,278,980 A | 1/1994 | Pedersen et al. | | |
| 5,317,507 A | 5/1994 | Gallant | ...... | 707/532 |
| 5,325,298 A | 6/1994 | Gallant | ...... | 704/9 |
| 5,390,281 A * | 2/1995 | Luciw et al. | ...... | 706/11 |
| 5,539,841 A | 7/1996 | Huttenlocher et al. | ...... | 382/218 |
| 5,551,049 A | 8/1996 | Kaplan et al. | ...... | 707/532 |
| 5,619,709 A | 4/1997 | Caid et al. | ...... | 395/794 |
| 5,675,819 A | 10/1997 | Schuetze | ...... | 704/10 |
| 5,694,523 A | 12/1997 | Wical | ...... | 706/45 |
| 5,696,962 A | 12/1997 | Kupiec | ...... | 395/604 |
| 5,708,825 A | 1/1998 | Sotomayor | ...... | 395/762 |
| 5,721,897 A | 2/1998 | Rubinstein | ...... | 707/2 |
| 5,778,362 A | 7/1998 | Deerwester | ...... | 707/5 |
| 5,778,378 A | 7/1998 | Rubin | ...... | 707/103 |
| 5,778,397 A | 7/1998 | Kupiec et al. | ...... | 707/500 |
| 5,794,178 A | 8/1998 | Caid et al. | ...... | 704/9 |
| 5,799,276 A | 8/1998 | Komissarchik et al. | ...... | 704/251 |
| 5,822,731 A | 10/1998 | Schultz | ...... | 704/256 |
| 5,832,470 A | 11/1998 | Morita et al. | | |
| 5,867,799 A | 2/1999 | Lang et al. | ...... | 707/1 |
| 5,873,056 A | 2/1999 | Liddy et al. | ...... | 704/9 |
| 5,934,910 A | 8/1999 | Ho et al. | ...... | 434/362 |
| 5,937,400 A | 8/1999 | Au | | |
| 5,940,821 A | 8/1999 | Wical | ...... | 707/3 |
| 5,963,965 A | 10/1999 | Vogel | ...... | 707/501.1 |
| 5,966,686 A | 10/1999 | Heidorn et al. | ...... | 704/9 |
| 5,970,490 A | 10/1999 | Morgenstern | ...... | 707/10 |
| 5,974,412 A | 10/1999 | Hazlehurst et al. | ...... | 707/3 |
| 5,991,713 A | 11/1999 | Unger et al. | ...... | 704/9 |
| 6,006,221 A | 12/1999 | Liddy et al. | | |

(Continued)

OTHER PUBLICATIONS

Noam Chomsky, "Language and Thought," 1993, pp. 18-19, 22-27, 44-45, 60-61.

(Continued)

*Primary Examiner*—Jeffrey Pwu
*Assistant Examiner*—Arrienne M. Lezak
(74) *Attorney, Agent, or Firm*—Marger, Johnson, & McCollom, P.C.

(57) ABSTRACT

As content flows across a computer network, the content stream is monitored and compared with a template. If the content stream comes within a threshold distance of the template, a policy is enforced on the network.

20 Claims, 13 Drawing Sheets

U.S. PATENT DOCUMENTS

| | | | |
|---|---|---|---|
| 6,009,418 A | 12/1999 | Cooper | 706/15 |
| 6,078,953 A * | 6/2000 | Vaid et al. | 709/223 |
| 6,085,201 A | 7/2000 | Tso | |
| 6,097,697 A * | 8/2000 | Yao et al. | 370/230 |
| 6,105,044 A | 8/2000 | DeRose et al. | |
| 6,108,619 A | 8/2000 | Carter et al. | 704/9 |
| 6,122,628 A | 9/2000 | Castelli | |
| 6,173,261 B1 | 1/2001 | Arai et al. | 704/257 |
| 6,205,456 B1 | 3/2001 | Nakao | 707/531 |
| 6,289,353 B1 | 9/2001 | Hazlehurst et al. | 707/102 |
| 6,295,533 B2 | 9/2001 | Cohen | |
| 6,297,824 B1 | 10/2001 | Hearst et al. | |
| 6,311,194 B1 | 10/2001 | Sheth et al. | 707/505 |
| 6,317,708 B1 | 11/2001 | Witbrock et al. | 704/9 |
| 6,317,709 B1 | 11/2001 | Zack | 704/225 |
| 6,356,864 B1 | 3/2002 | Foltz et al. | 704/1 |
| 6,363,378 B1 * | 3/2002 | Conklin et al. | 707/5 |
| 6,459,809 B1 | 10/2002 | Jensen et al. | 382/203 |
| 6,470,307 B1 | 10/2002 | Turney | 704/9 |
| 6,493,663 B1 | 12/2002 | Ueda | |
| 6,513,031 B1 * | 1/2003 | Fries et al. | 707/3 |
| 6,523,026 B1 | 2/2003 | Gillis | 707/3 |
| 6,615,208 B1 | 9/2003 | Behrens et al. | 707/5 |
| 6,675,159 B1 | 1/2004 | Lin et al. | 707/3 |

OTHER PUBLICATIONS

Jonathan Culler, "Ferdinand de Saussure—Revised Edition," 1986, pp. 38-57.
Umberto Eco, Marco Santambrogio and Patrizia Violi (Editors), "Meaning and Mental Representations," 1988, pp. 221.
Donald W. Kahn, "Topology—An Introduction to the Point-Set and Algebraic Areas," 1975, pp. 10-15.
Paul R. Halmos, "Naïve Set Theory," 1960, pp. 56-57, 66-69.
John G. Hocking and Gail S. Young, "Topology," 1961, pp. 6-7, 56-59, 68-71.
Umberto Eco, "Semiotics and the Philosophy of Language," 1984, pp. 46-87.
Noam Chomsky, "The Minimalist Program," 1995, pp. 13-65.
R. E. Edwards, "Functional Analysis—Theory and Applications," 1965, pp. 10-13, 32-33, 50-53, 62-65, 88-103, 174-203, 224-233.
*Applications of Functional Analysis and Operator Theory,* V. Hutson, J.S. Pym, 1980, table of contents, preface and index.
Latent Semantic Indexing is an Optimal Special Case of Multidimensional Scaling, Brian T. Bartell, Garrison W. Cottrell, Richard K. Belew, pp. 161-167, 1992; ACM 0-89791-524-0.
Improving Relevance Feedback in the Vector Space Model, Carol Lundquist, David A. Grossman, Ophir Frieder, 1997, pp. 16-23; ACM 0-89791-970-X.
A Multilevel Approach to Intelligent Information Filtering: Model, System, and Evaluation, J. Mostafa, S. Mukhopadhyay, W. Lam, M. Palakal, ACM Transactions On Information Systems, vol. 15, No. 4, Oct. 1997, pp. 368-399.
Capturing the State of Distributed Systems with XML, Rohit Khare and Adam Rifkin, Oct. 26, 1997, pp. 1-12.
Semantic Information Retrieval, Annelise Mark Pejtersen, pp. 90-92, Communications of the ACM, Apr. 1998/vol. 41, No. 5.
Unifying Heterogeneous Information Models, Narinder Singh, pp. 37-44, Communications of the ACM, May 1998/vol. 41, No. 5.
Platform for Internet Content Selection (PICS), Jan. 3, 1998, http://www.w3.org/pics/.
Intelligent Collaboration & Visualization, pp. 1-16.
Cognitive Science Laboratory at Princeton University, "WordNet—A Lexical Database for English," printed Feb. 10, 2000, selected pages from website.
George W. Smith, "Computers and Human Language," 1991, pp. 204-257.
Vivian Cook and Mark Newson, "Chomsky's Universal Grammar—An Introduction," 1988, pp. 40-74, 131-272.
David Pesetsky, "Zero Syntax Experiences and Cascades," 1995, pp. 1-122.
Bartell et al., Latent Semantic Indexing is an Optimal Special Case of Multidimensional Scaling, Citeseer, pp. 1-7.
Bartell, et al., "Latent Semantic Indexing is an Optimal Special Case of Multidimensional Scaling," *Dept. of Computer Science & Engineering,* University of California, San Diego, 1992, 7 pages.
Chomsky, *"Language and Thought,"* 1993, pp. 18-19, 22-27, 44-45, 60-61.
Chomsky, *"The Minimalist Program,"* 1995, pp. 13-65.
Cook et al., *"Chomsky's Universal Grammar—An Introduction,"* 1988, pp. 40-74, 131-272.
Culler, *"Ferdinand de Saussure—Revised Edition,"* 1986 pp. 38-57.
Eco et al., *"Meaning and Mental Representations,"* 1988, p. 221.
Eco, *"Semiotics and the Philosophy of Language,"* 1984, p. 46-86.
Edwards, *"Functional Analysis: theory and applications,"* 1965, pp. 10-13, 32-33, 50-53, 62-65, 88-103, 174-203, 224-233.
Halmos, *"Naïve Set Theory,"* Undergraduate Texts in Mathematics, 1968, pp. 56-57, 66-69.
Hocking, *"Topology,",* 1961, pp. 6-7, 56-59, 68-71.
Hutson, *"Applications of Functional Analysis and Operator Theory,"* 1980, index, preface, and Table of Contents.
Kahn, *"Topology: An Introduction to the Point-Set and Algebraic Areas,"* 1975, pp. 10-15.
Khare et al., *"Capturing the State of Distributed Systems with XML,"* Oct. 26, 1997, pp. 1-12.
Lundquist et al., *"Improving Relevance Feedback in the Vector Space Model,"* 1997, pp. 16-23.
Mostafa et al., "A Multilevel Approach to Intelligent Information Filtering: Model, System, and Evaluation," *ACM Transactions on Information Systems,* vol. 15, No. 4, Oct. 1997, pp. 368-399.
Pesetsky, *"Zero Syntax: experiencers and cascades,"* 1995, pp. 1-122.
Pejtersen, "Semantic Information Retrieval," *Communications of the ACM,* vol. 41, No. 5, Apr. 1998, pp. 90-92.
*"Platform for Internet Content Selections (PICS),"* http://www.w3.org, pp. 1-8.
Singh, "Unifying Heterogeneous Information Models," *Tesserae Information Systems, Inc.,* http://citeseer.ist.psu.edu.com, pp. 1-13.
Smith, *"Computers and human language,"* 1991, pp. 205-257.
"WordNet—a lexical database for the English language," *Cognitive Science Laboratory,* Princeton University, www.cogsci.princeton.edu, 2 pgs.
Onyshkevych and Nirenburg; *"A Lexicon for Knowledge-Based MT";* Undated (pp. 1-49).
Mahesh; *"Ontology Development for Machine Translation: Ideology and Method";* Computing Research Laboratory, New Mexico State University; Undated (87 pages).

* cited by examiner

POLICY ENFORCEMENT USING THE SEMANTIC CHARACTERIZATION OF TRAFFIC

RELATED APPLICATION DATA

This application is related to U.S. Pat. No. 6,108,619, issued Aug. 22, 2000, titled "METHOD AND APPARATUS FOR SEMANTIC CHARACTERIZATION," to co-pending U.S. patent application Ser. No. 09/512,963, titled "CONSTRUCTION, MANIPULATION, AND COMPARISON OF A MULTI-DIMENSIONAL SEMANTIC SPACE," filed Feb. 25, 2000, to co-pending U.S. patent application Ser. No. 09/615,726, titled "A METHOD AND MECHANISM FOR THE CREATION, MAINTENANCE, AND COMPARISON OF SEMANTIC ABSTRACTS," filed Jul. 13, 2000, and to U.S. patent application Ser. No. 09/653,713, titled "INTENTIONAL-STANCE CHARACTERIZATION OF A GENERAL CONTENT STREAM OR REPOSITORY," filed simultaneously herewith and incorporated by reference herein, all commonly assigned.

FIELD OF THE INVENTION

This invention pertains to enforcing network policy decisions in a computer system, and more particularly to enforcing policy decisions by monitoring network traffic and content.

BACKGROUND OF THE INVENTION

In the prior art, policy enforcement is performed by counting packets traveling from their source to their destination. Most policy enforcement implementations ignore the content of the packets traversing the system. If the amount of traffic between source and destination Internet Protocol (IP) addresses becomes excessive, the policy enforcement implementation applies a limit to the packet flow.

One policy enforcement implementation (Layer 7) ostensibly considers the semantic content of the packets crossing the system. Layer 7 looks at tags in the header of the packet. If too many packets having a particular tag are crossing the system, Layer 7 restricts the flow of packets. But Layer 7 only considers tags in the packet header, and does not actually look at the semantic content of the packets. Thus, a program that sought to bypass the policy enforcement of Layer 7 only has to fraudulently label the tag in the header of the packet, and the policy will not be enforced against the packet.

U.S. patent application Ser. No. 09/653,713, titled "INTENTIONAL-STANCE CHARACTERIZATION OF A GENERAL CONTENT STREAM OR REPOSITORY," filed simultaneously herewith, incorporated by reference herein, and referred to as "the Intentional Stance application," describes how users can listen to a content stream and set up response actions according to the content. Templates that include a set of state vectors in a topological vector space define the trigger. When the semantic content of the content stream comes close enough to the template, the action is triggered. But the Intentional Stance application does not describe how a network policy can be enforced using templates.

The present invention addresses these and other problems associated with the prior art.

SUMMARY OF THE INVENTION

The invention is a method and apparatus for enforcing policy over a computer network. A template is defined and assigned a policy. The network is then monitored to watch content in a content stream. When the content stream comes within a threshold distance of the template, the policy is enforced.

The foregoing and other features, objects, and advantages of the invention will become more readily apparent from the following detailed description, which proceeds with reference to the accompanying drawings.

DETAILED DESCRIPTION OF THE PREFERRED EMBODIMENT

U.S. patent application Ser. No. 09/653,713, titled "INTENTIONAL-STANCE CHARACTERIZATION OF A GENERAL CONTENT STREAM OR REPOSITORY," filed simultaneously herewith, is incorporated by reference herein and referred to as "the Intentional Stance application," and further incorporates by reference U.S. patent application Ser. No. 09/512,963, titled "CONSTRUCTION, MANIPULATION, AND COMPARISON OF A MULTI-DIMENSIONAL SEMANTIC SPACE," filed Feb. 25, 2000. The Intentional Stance application describes the creation of templates to use in intentional stance characterization. Recall that a template is a set of vectors defined by a semantic content. The template is compared with a content source. If the content source is close enough to the template, an action associated with the template is triggered.

Figure 1:
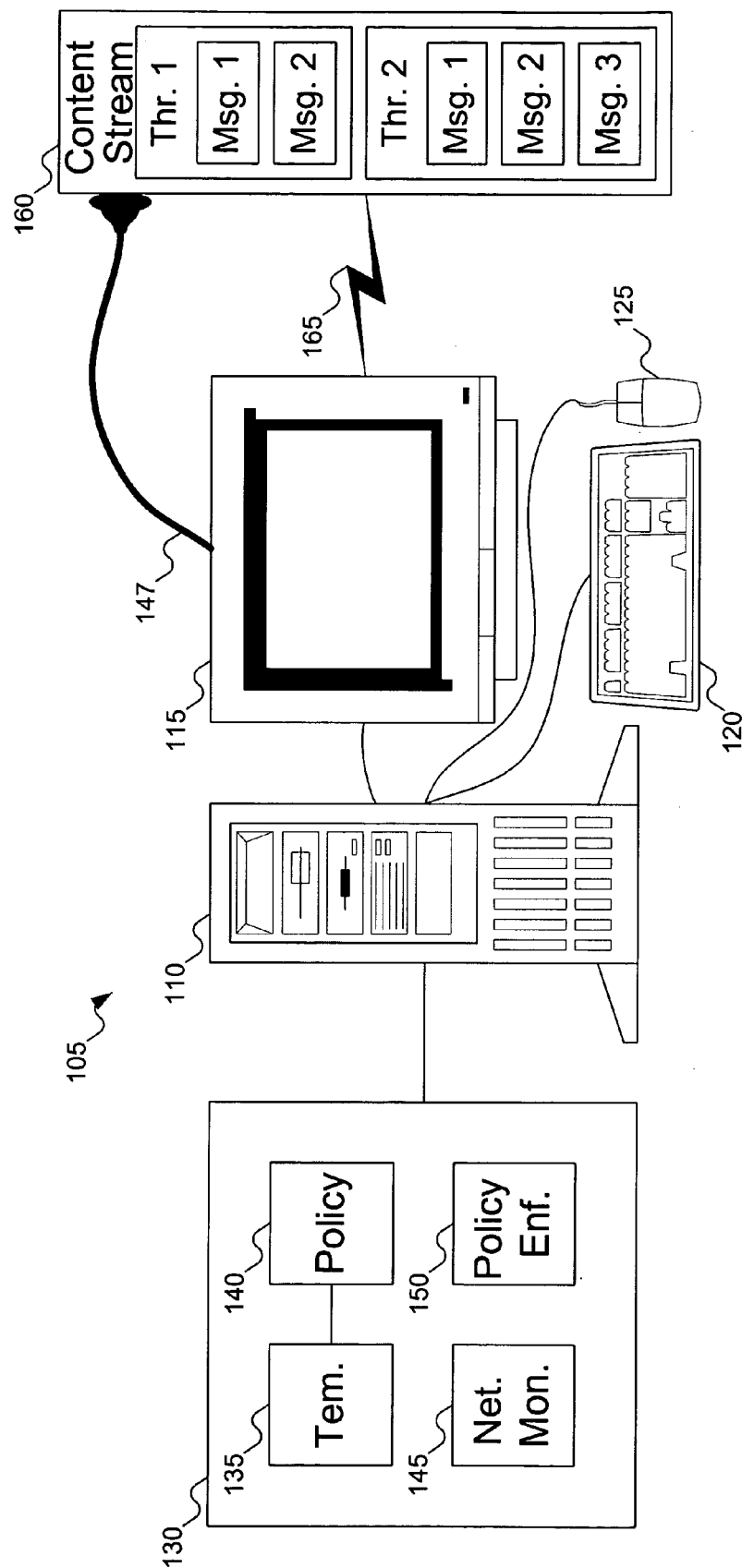
FIG. 1 shows a computer system on which the invention can operate to use a template to enforce network policy.

FIG. 1 shows a computer system 105 on which templates can be used to enforce network policy. Computer system 105 conventionally includes a computer 110, a monitor 115, a keyboard 120, and a mouse 125. But computer system 105 can also be an Internet appliance, lacking monitor 115, keyboard 120, or mouse 125. Optional equipment not shown in FIG. 1 can include a printer and other input/output devices. Also not shown in FIG. 1 are the conventional internal components of computer system 105: e.g., a central processing unit, memory, file system, etc.

Computer system 105 further includes software 130. In FIG. 1, software 130 includes template 135, policy 140, network monitoring software 145, and policy enforcer 150. Template 135 is the template indicating the content to which associated policy 140 is to be applied. Network monitoring software 145 is responsible for monitoring the network, both for content and for metadata about the content. (Metadata is data about data, in this case about the content stream. For example, metadata about the content stream can include the percentage of traffic related to content close to the template. The collecting of metadata is represented pictographically by sensor 147.) Policy enforcer 150 is responsible for enforcing policy 140 when the content stream is close to template 135.

Although the content compared with template 135 can be found stored on computer system 105, this is not required. FIG. 1 shows computer system 105 accessing content stream 160 over network connection 165. Content stream 160 can be a single document, or it can include multiple sources. Content streams with multiple sources are common in today's world. For example, newsgroups and discussion lists (e-mail lists) allow multiple users to carry on several conversations on multiple topics at the same time. Newsgroups and discussion lists are typically organized into a hierarchy. The newsgroup itself has a content focus. This content focus is divided into sub-topics, called threads. Each thread is further divided into individual messages from individual users. FIG. 1 shows content stream 160 as having two threads. Thread one has two messages, and thread two has three messages.

Network connection 165 can include any kind of network connection. For example, network connection 165 can enable computer system 105 to access content stream 160 over a local area network (LAN), a wide area network (WAN), a global internetwork, or any other type of network. Similarly, once collected, the impact summary can be stored somewhere on computer system 105, or can be stored elsewhere using network connection 165.

Figure 2:
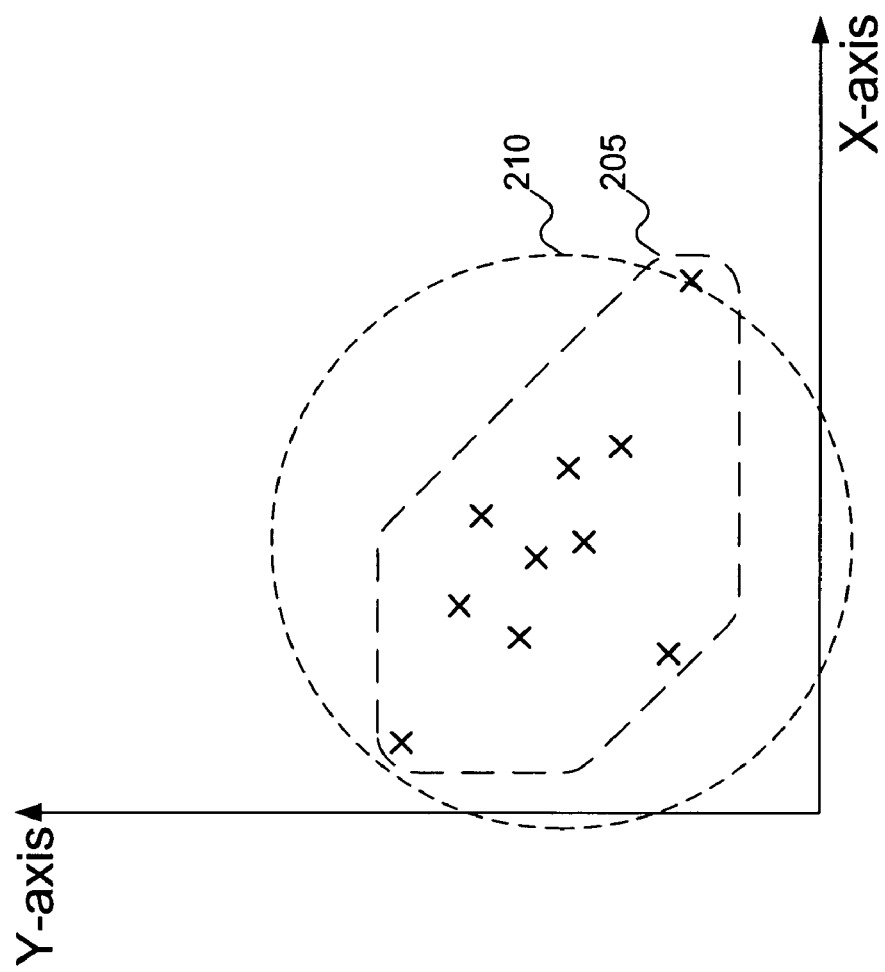
FIG. 2 shows a two-dimensional topological vector space in which a template is presented.

FIG. 2 shows a two-dimensional topological vector space in which a template includes a set of state vectors. (FIGS. 2 and 3, although accurate representations of a topological vector space, are greatly simplified for example purposes, since most topological vector spaces will have significantly higher dimensions.) In FIG. 2, template 205 includes the state vectors represented by the "x" symbols. (For clarity, the line segments from the origin of the topological vector space to the heads of the state vectors are not shown in FIG. 2.)

Circle 210 represents the threshold distance defined for template 205 before the policy is enforced. The reader will recognize that circle 210 is an abstraction, since in the preferred embodiment distance is not measured from a single point in the topological vector space. Instead, in the preferred embodiment distance is measured from the entire set of vectors comprising the template, using the Hausdorff distance function or alternative measures suggested in the Intentional Stance application. But if template 205 could be reduced to a single point in the topological vector space, circle 210 could represent a threshold distance. Any content that comes within circle 210 would then trigger the policy associated with template 205.

Figure 3:
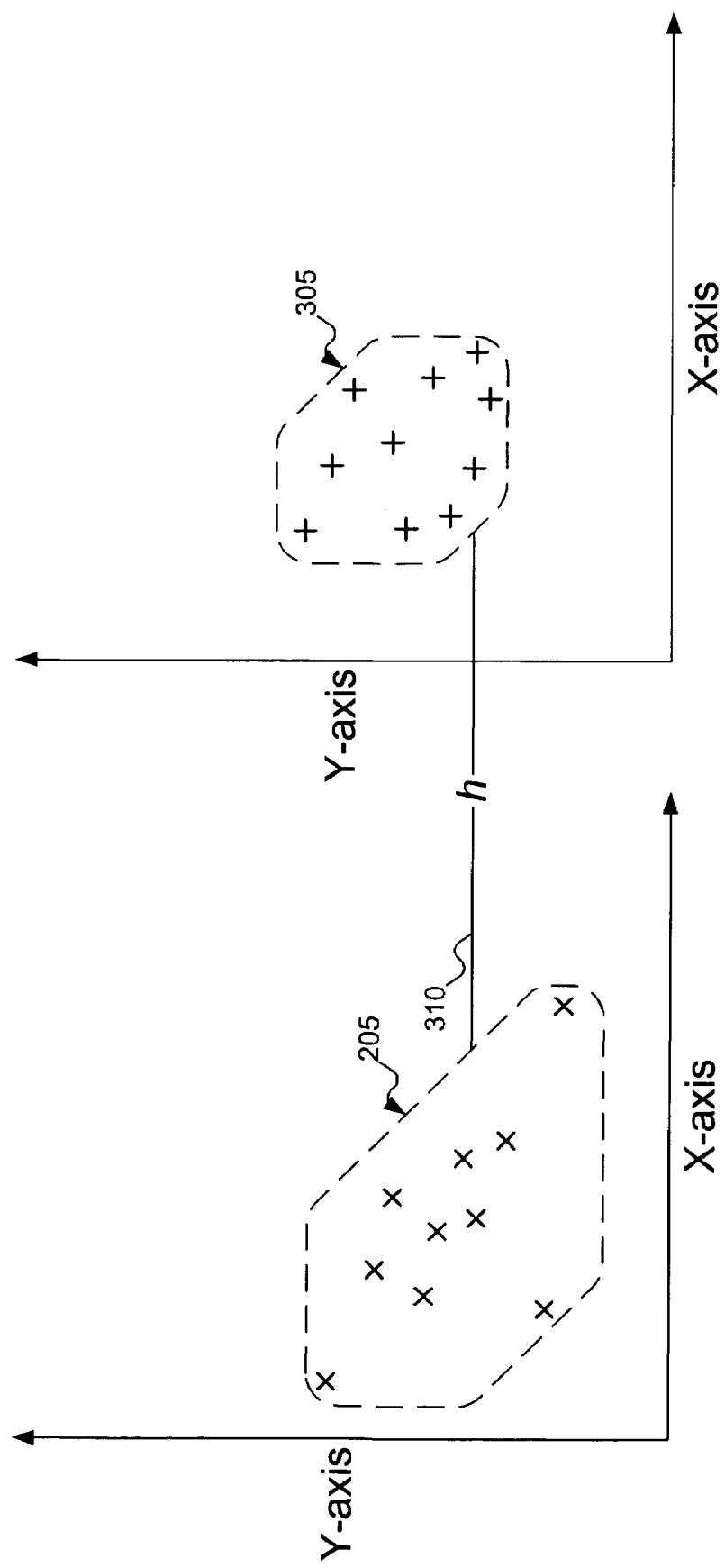
FIG. 3 shows a two-dimensional topological vector space in which the distance between a template and a content stream is measured.

FIG. 3 shows a two-dimensional topological vector space in which template 205 is compared with an impact summary for a content source. (To avoid clutter in the drawing, FIG. 3 shows template 205 and impact summary 305 in different graphs of the same topological vector space. The reader can imagine the template and impact summary as being in the same graph.) Using the Hausdorff or other distance function, the distance 310 between template 205 and impact summary 305 can be quantified. If distance 310 is smaller than the threshold distance defined for template 205, then the policy associated with template 205 will be triggered.

Figure 4:
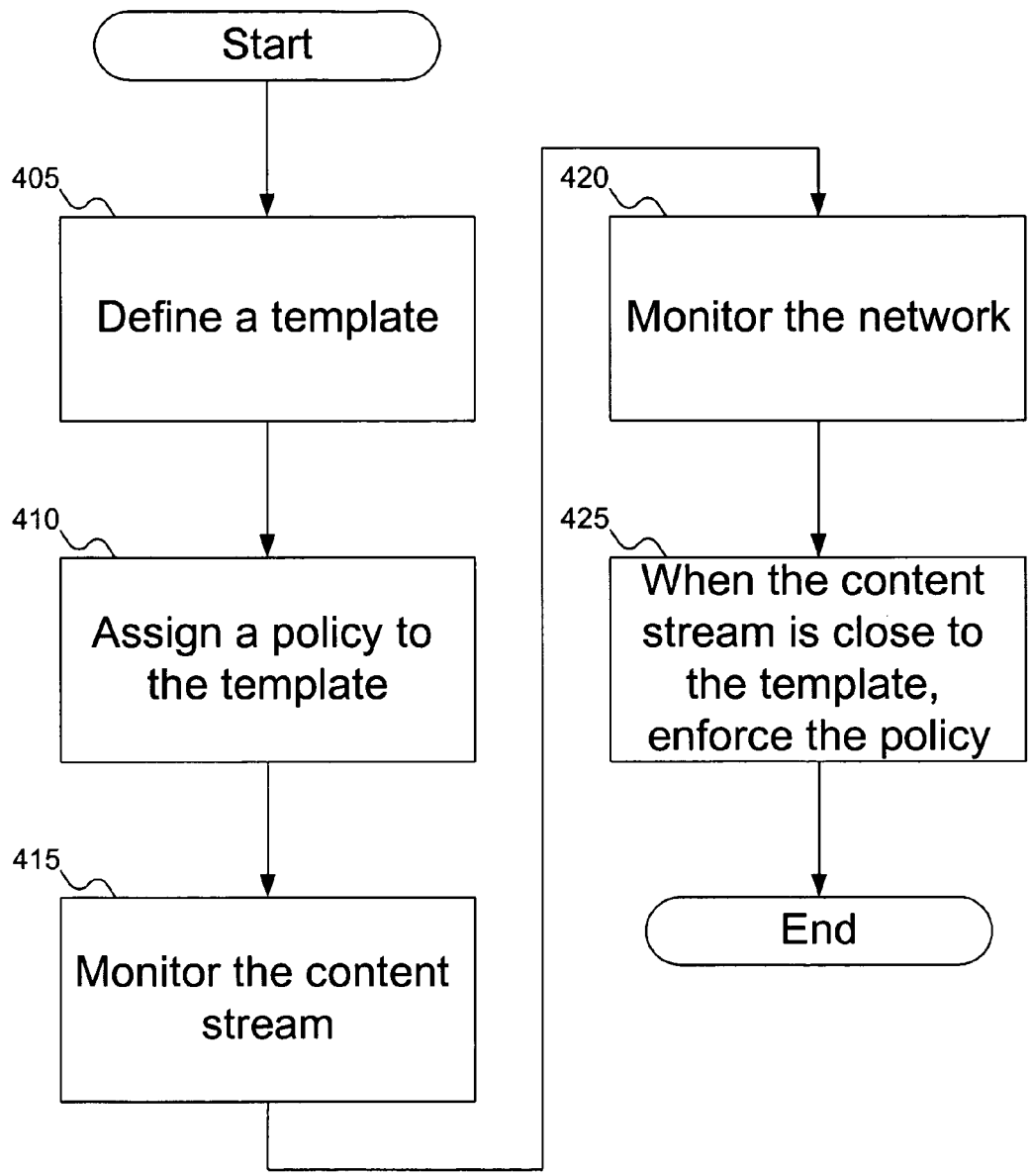
FIG. 4 shows a flowchart of a method according to the preferred embodiment of the invention to use a template in the computer system of FIG. 1 to enforce network policy.

FIG. 4 shows a flowchart of a method according to the preferred embodiment of the invention to use a template to enforce network policy in the computer system of FIG. 1. At step 405 a template is defined. At step 410, a policy is defined and assigned to the template. At step 415, the content stream is monitored to see how close it comes to the template. At step 420, the network is monitored to determine metadata about the content stream (e.g., the percentage of network traffic devoted to the content stream triggering the template). At step 425, if the content stream comes close enough to be within the threshold distance for the template, the associated policy is enforced.

As an example of a possible network policy and its use, consider a server supporting newsgroup traffic. (As the reader will recall, a newsgroup carries multiple threads, each thread composed of messages generated by readers of the newsgroup.) One such newsgroup can be dedicated to medicine. Because the subject of abortion is generally controversial, the system administrator for the server can set a low bandwidth limit to messages relating to abortion. For example, the system administrator can set the policy to limit total bandwidth to messages relating to abortion at 5% of the bandwidth for the newsgroup. Similarly, the system administrator can set a policy dedicating a minimum guaranteed bandwidth to a subject, so that topical subjects are not lost for lack of bandwidth.

As an additional example, consider a network where security is an issue. In such systems, users typically have differing levels of access, depending on their security rating. Rather than assigning security levels to individual files, the system administrator can establish a policy that persons with particular security levels are to be denied access to documents on particular subjects. This simplifies the administration process, as the number of policies will typically be far less than the number of files on the network. This also allows for a document's content to change, thereby affecting the document's security rating, without the system administrator having to change the document's security level.

A person skilled in the art will recognize that content streams are not static. Content changes over time. For example, returning to the example of the newsgroup, threads die out as users stop posting new messages regarding the thread or moderators kill improper threads. New threads pop up as new subjects are proposed. People's viewpoints change as one argument or another sways them. As content changes, the need for policy enforcement can accordingly change. Since content streams are dynamic and change over time, it is expected that the distance between the content stream and the template will vary over time. Accordingly, impact summaries need to be updated to remain current. A person skilled in the art will recognize how FIG. 4 (and FIG. 5, below) can be modified to track changes in the content stream.

Figure 5:
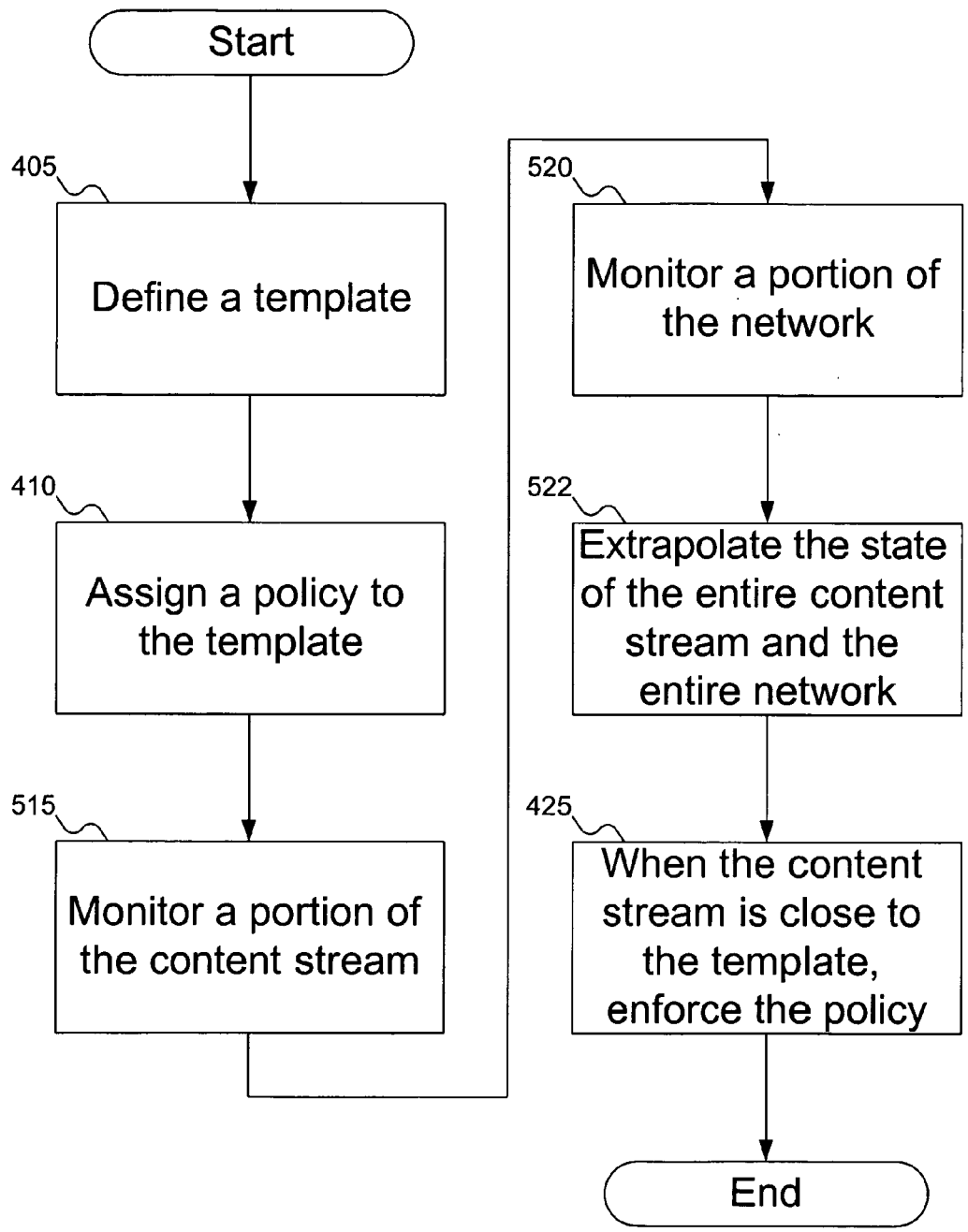
FIG. 5 shows a flowchart of a method according to an alternate embodiment of the invention to use a template in the computer system of FIG. 1 to enforce network policy.

FIG. 5 shows a flowchart of a method according to an alternative embodiment of the invention to use a template to enforce network policy in the computer system of FIG. 1. The changes relative to the flowchart of the method in FIG. 4 lie in the middle of the method. Instead of monitoring all of the content stream and the entire network, at step 515 only a portion of the content stream is monitored to see how close it comes to the template. At step 520, a portion of the network is monitored to determine metadata about the content stream (e.g., the percentage of network traffic devoted to the content stream triggering the template). Finally, at step 527, data and metadata about the entire content stream is extrapolated from the sampled data. For example, if only ⅓ of the content stream is monitored, then the collected data is multiplied by a factor of 3 to characterize the entire content stream.

Figure 6:
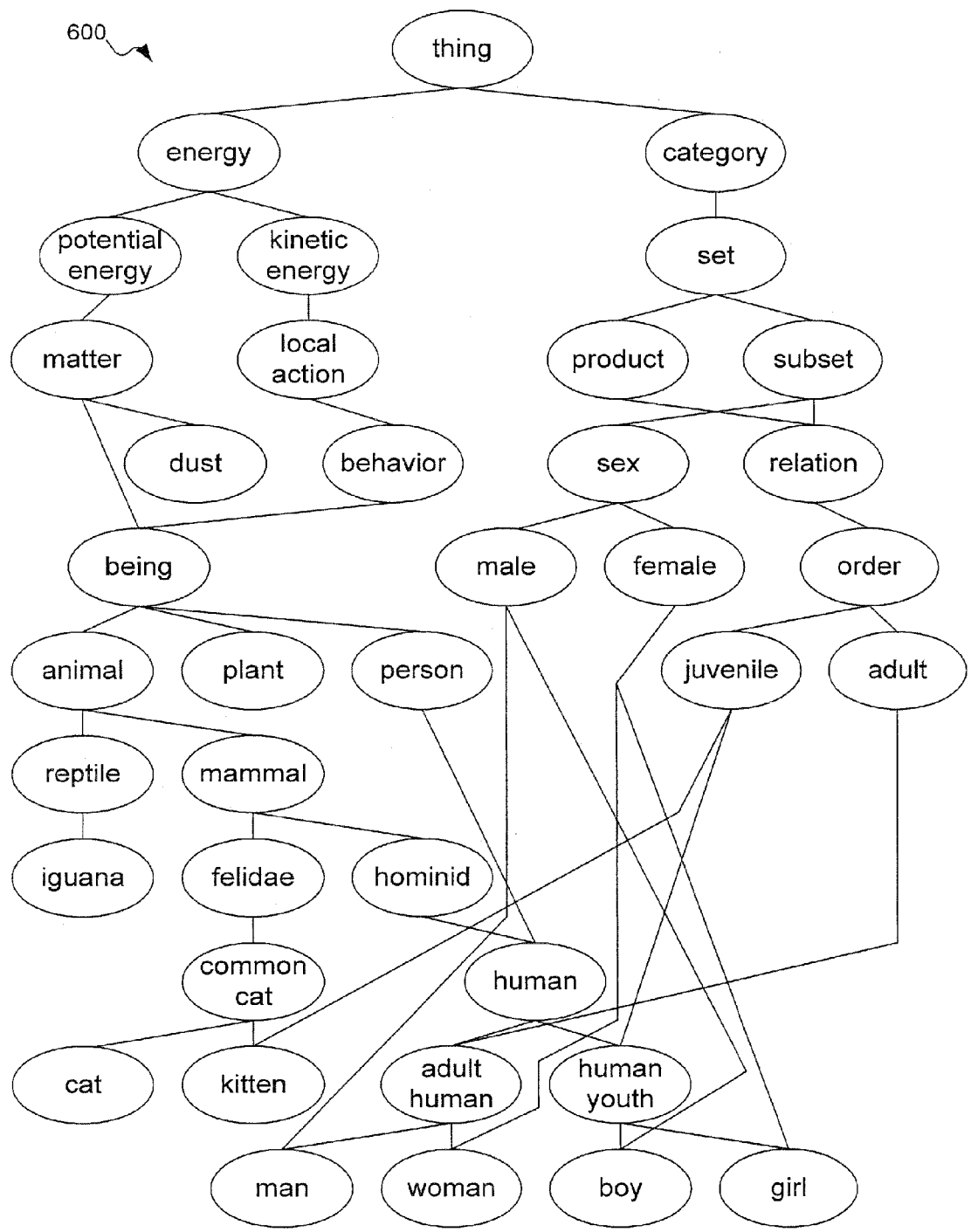
FIG. 6 shows a dictionary including concepts over which chains have been laid, from which intentional stance basis chains can be selected.

FIG. 6 shows a sample dictionary 600 including concepts and chains. (Dictionary 600 shown in FIG. 6 is drawn from the Construction application.) Dictionary 600 includes a set of concepts, typically organized as a directed set. At the top of the directed set is a particular concept known as the maximal element. For each concept in the directed set other than the maximal element, there is at least one "parent" concept in the directed set that is a generalization of that concept. (There can be multiple "parent" concepts, because language allows for overloading of words.) The relationships between concepts can be extended all the way to the maximal element; the hierarchy of such relationships between the maximal element and each concept are called chains.

Figure 7A:
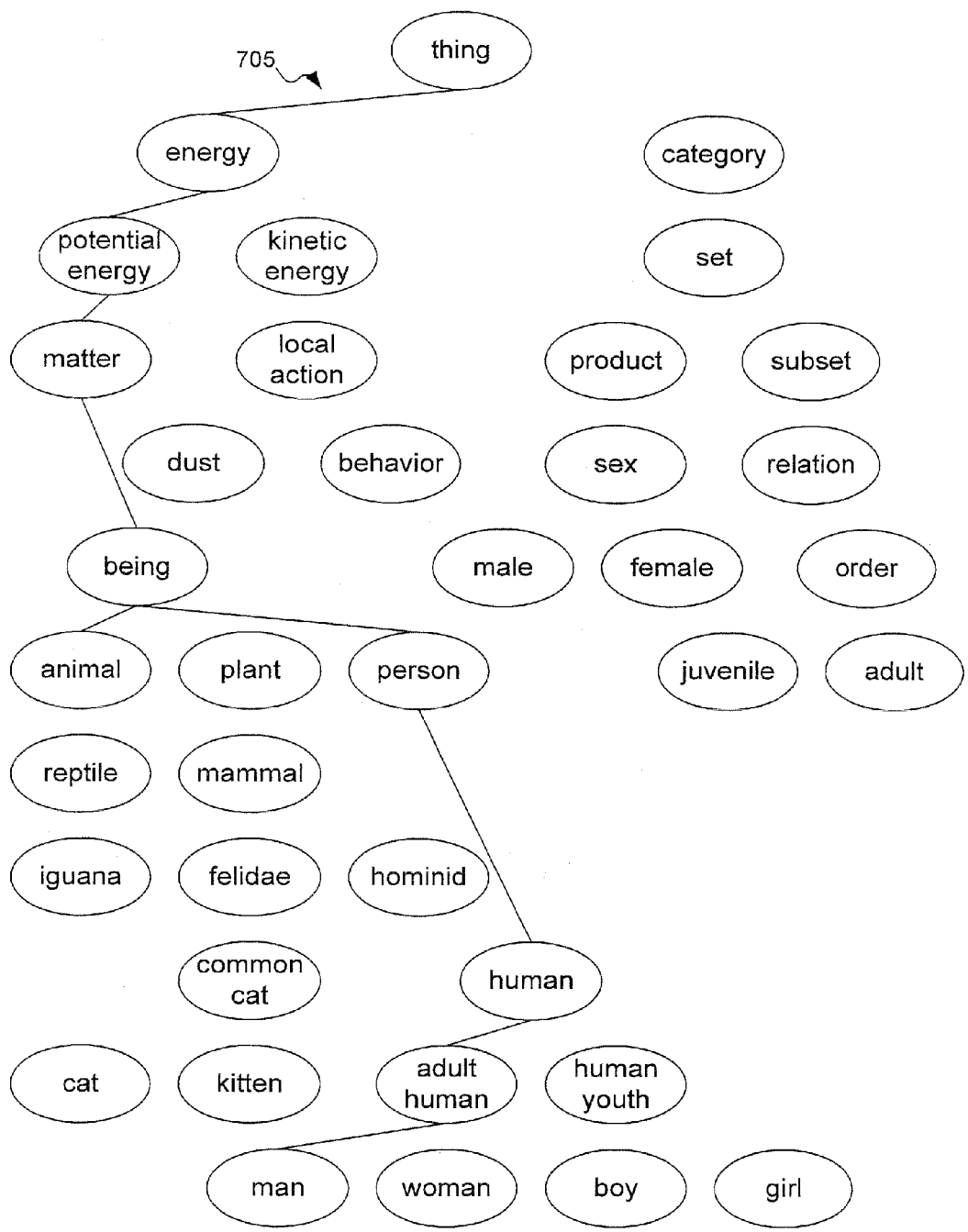
FIGS. 7A–7G show eight different intentional stance basis chains in the dictionary of FIG. 7.
Figure 7B:
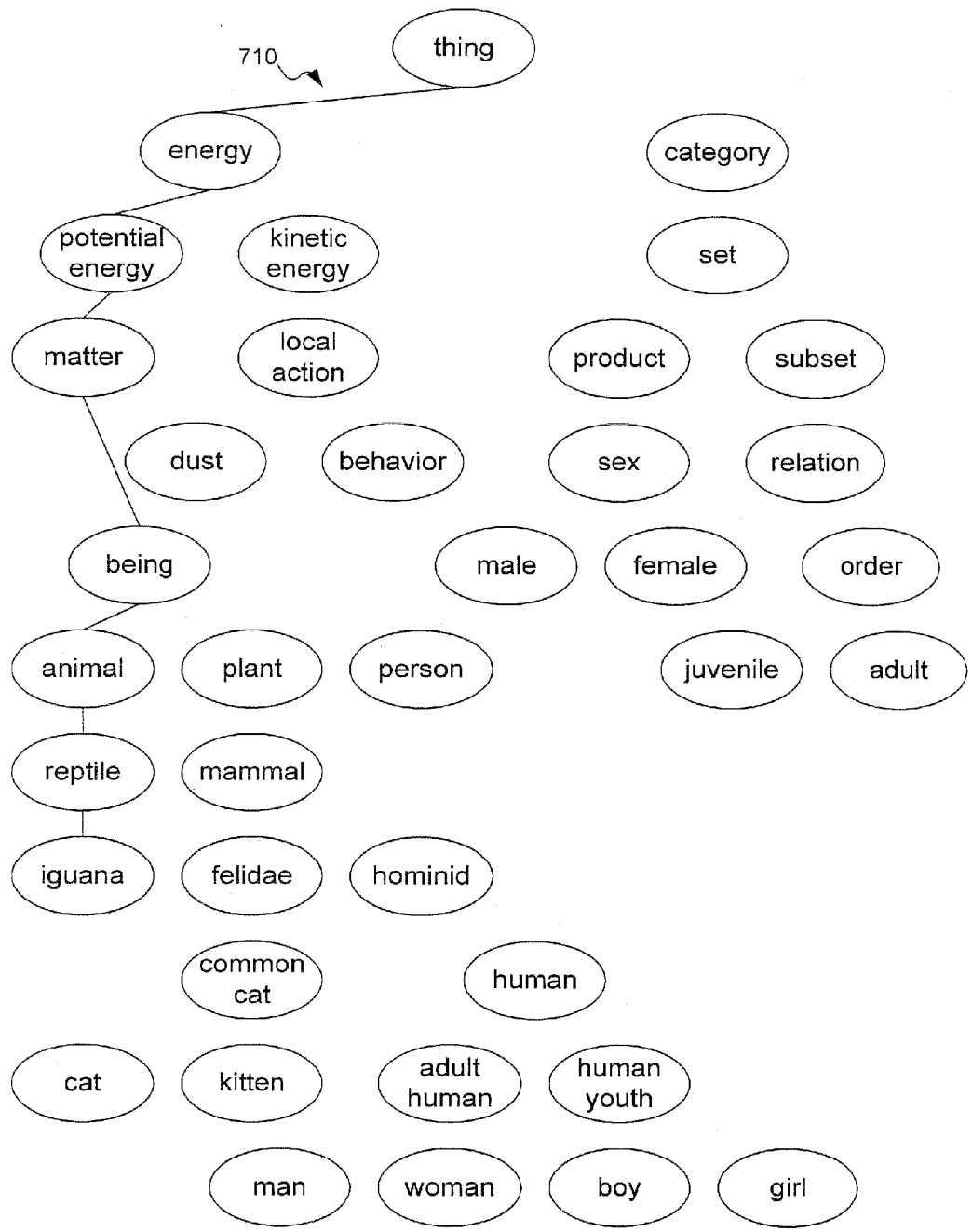
Figure 7C:
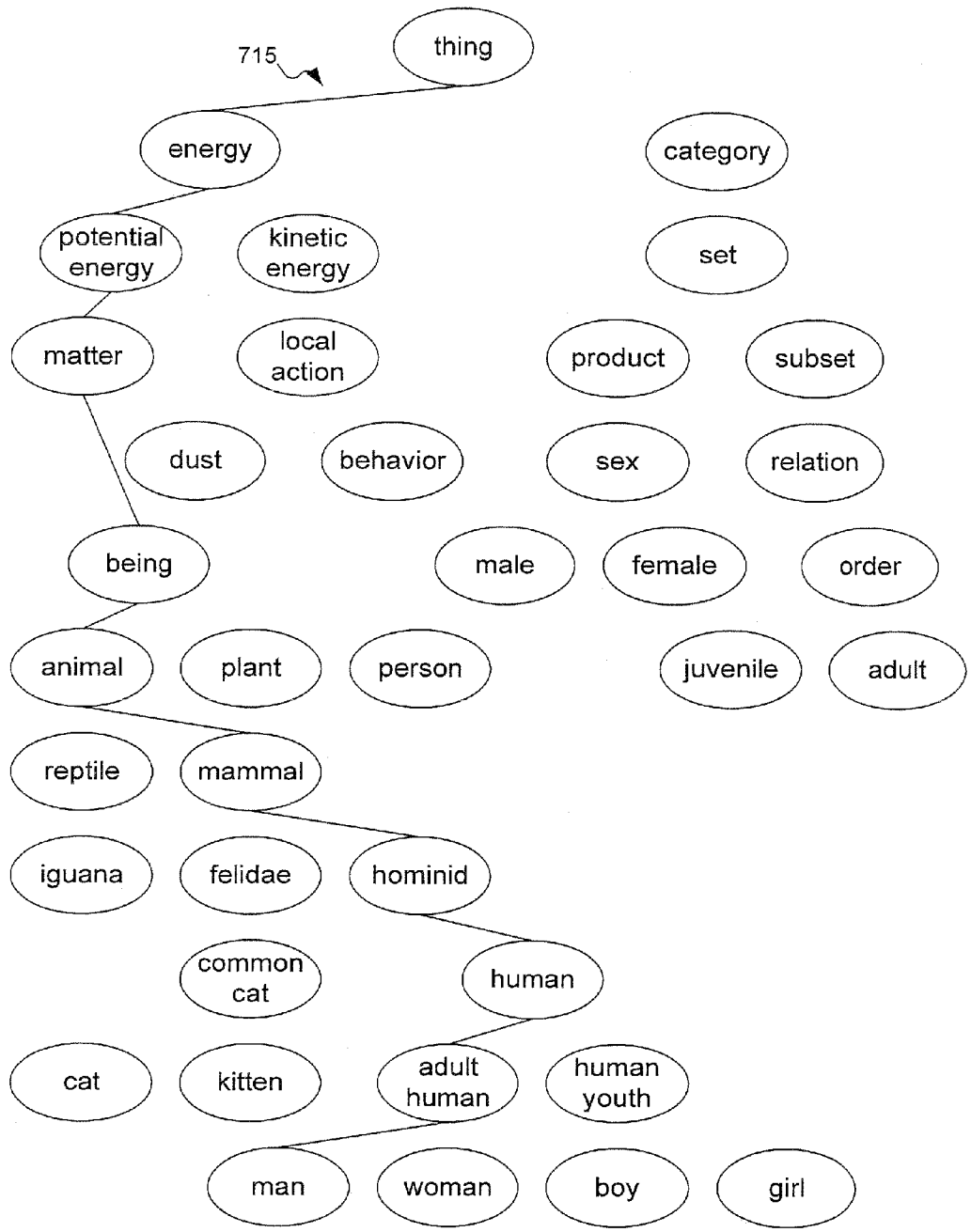
Figure 7D:
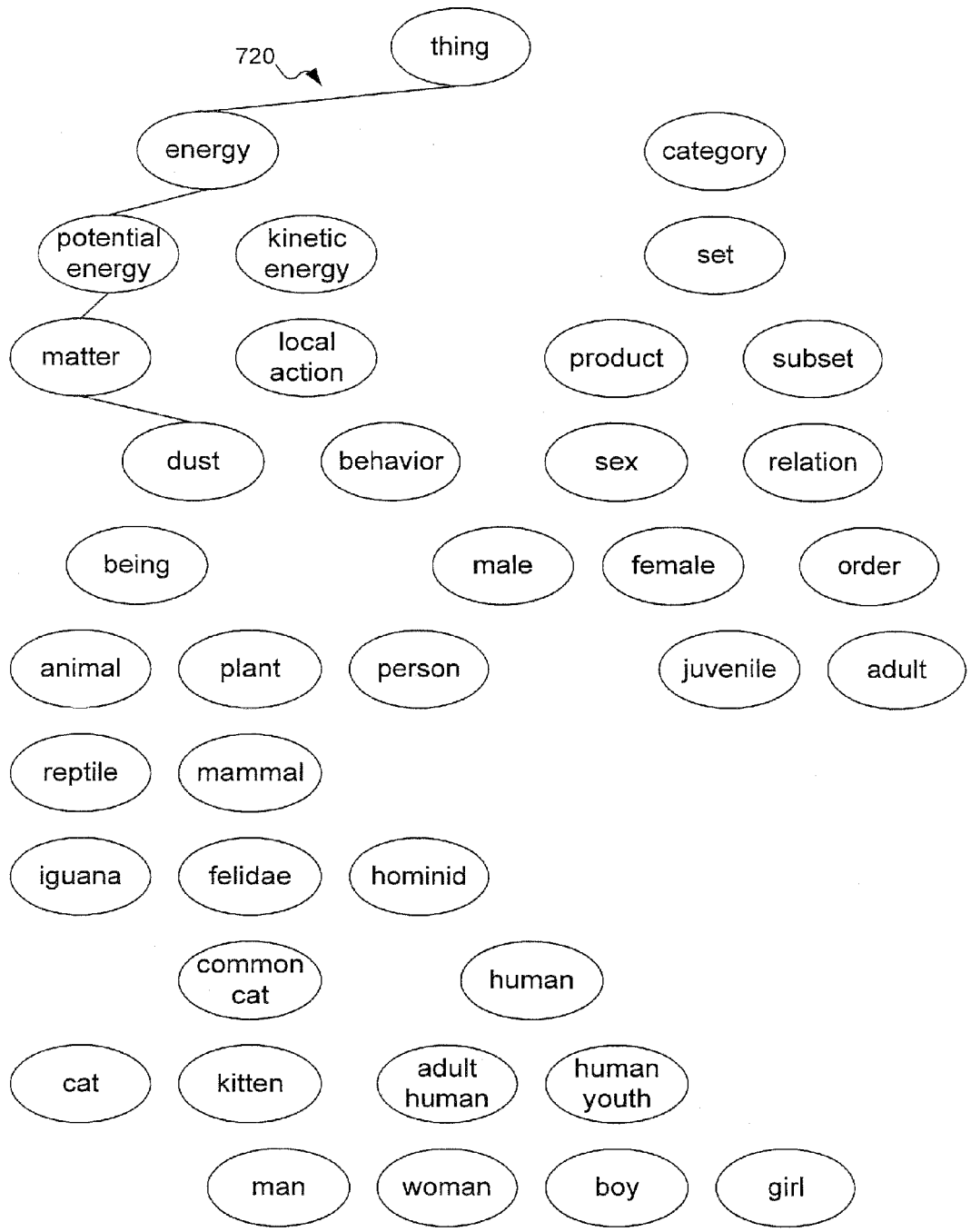
Figure 7E:
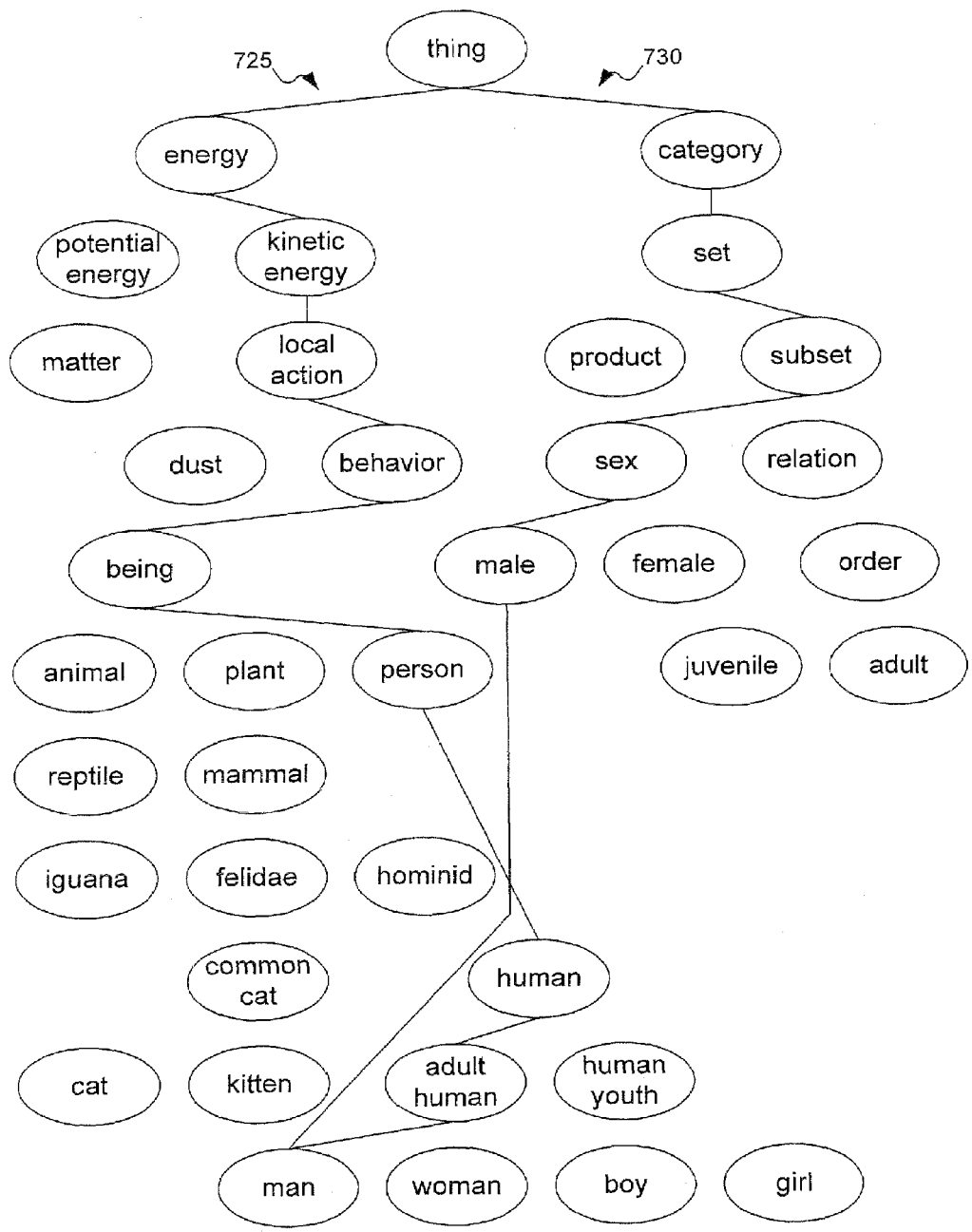
Figure 7F:
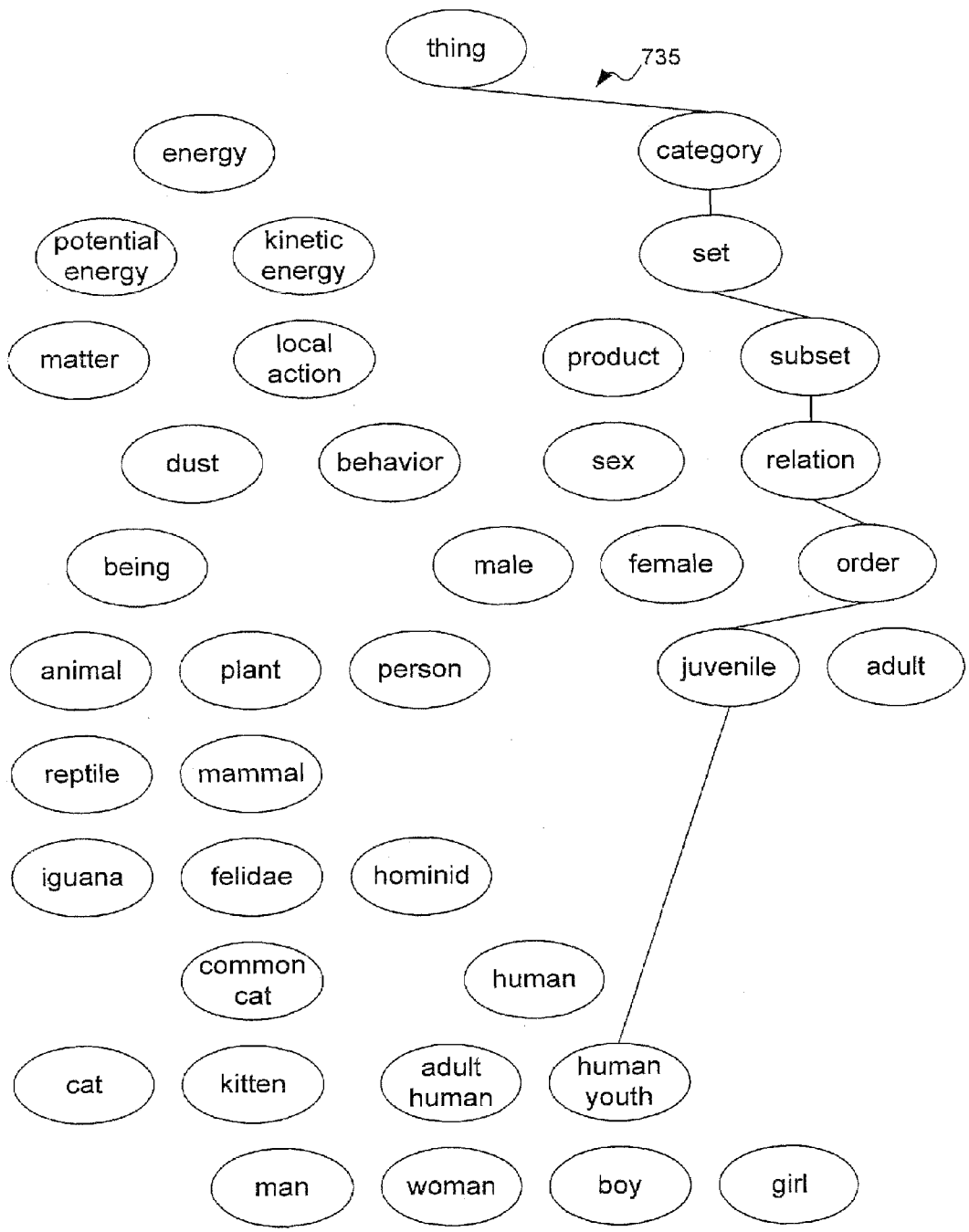
Figure 7G:
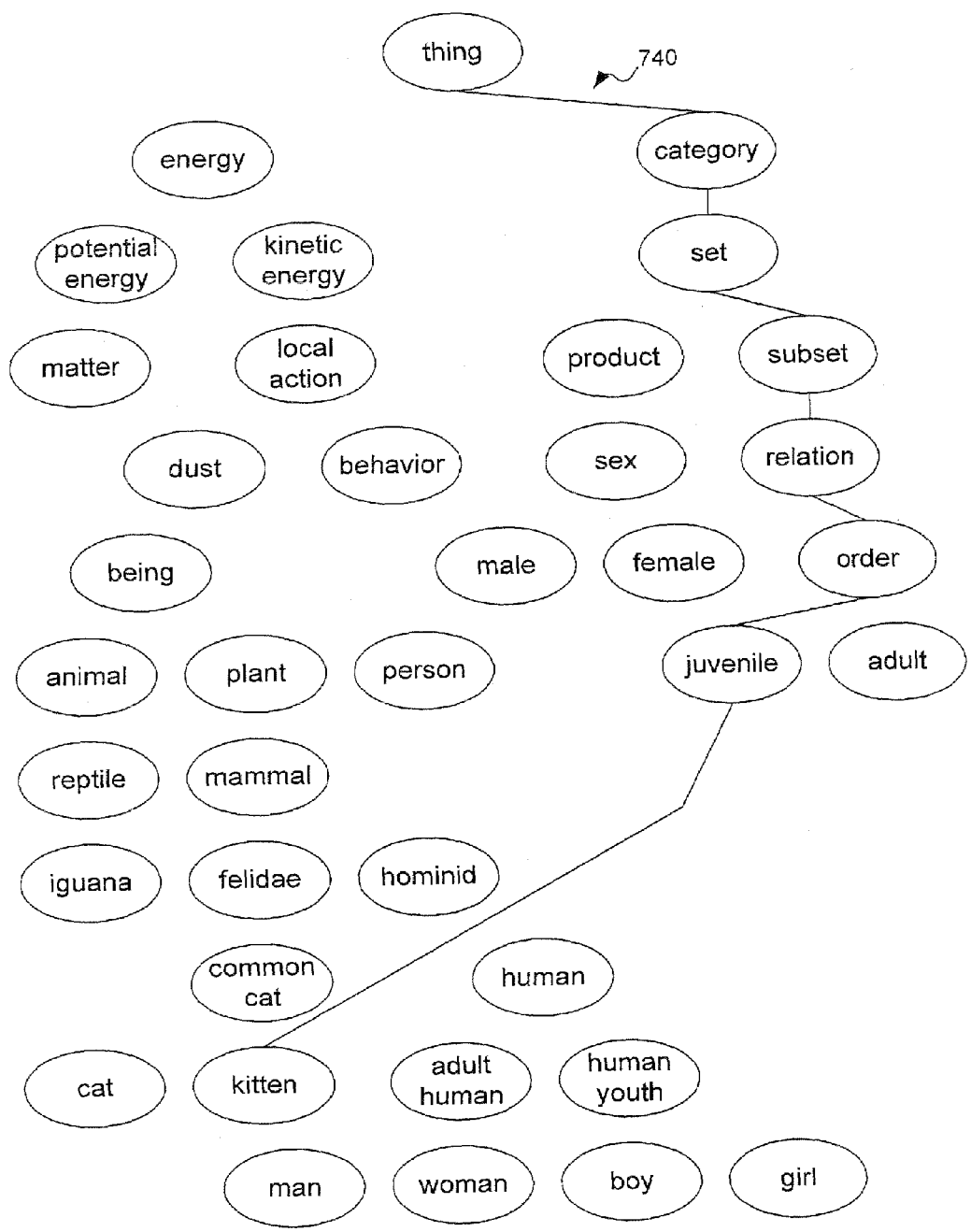

Intentional stance basis chains are a selected subset of the chains in dictionary 600. For example, FIGS. 7A–7G show eight different chains in the dictionary of FIG. 6 that can be selected as intentional stance basis chains. FIG. 7A shows chain 705, which extends to concept "man" through concept "energy." FIG. 7B shows chain 710 extending to concept "iguana." FIG. 7C shows another chain 715 extending to concept "man" via a different path. FIGS. 7D–7G show other chains.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A computer-implemented method for enforcing policy over a computer network, the method comprising:
   selecting a dictionary, the dictionary including a plurality of concepts organized as a directed set, exactly one concept identified as a maximal element, and for each concept in the directed set, at least one chain connecting the maximal element to the concept;
   selecting a set of chains to form a basis spanning a topological vector space;
   selecting at least one concept in the dictionary;
   creating a state vector in the topological vector space for each of the selected concepts, wherein each state vector includes at least one measure of how concretely the concept is represented in each chain in the basis;
   assembling into a template a first subset of the state vectors including at least first and second vectors in the topological vector space, the topological vector space including at least one state vector not in the template;
   assigning a policy to the computer network;
   monitoring a portion of a content stream on the computer network to construct an impact summary, the impact summary including a second subset of the state vectors including at least third and fourth vectors in the topological vector space;
   extrapolating how close the entire content stream is to the template using the impact summary and the template; and
   enforcing the policy when the impact summary is within a threshold distance of the template.

2. A method according to claim 1, wherein assigning a policy includes assigning a policy to limit bandwidth on the computer network for content in the content stream within the threshold distance of the template.

3. A method according to claim 1, wherein assigning a policy includes assigning a policy to limit access to a document on the computer network within the threshold distance of the template.

4. A method according to claim 1, wherein monitoring a portion of a content stream includes monitoring metadata of the content stream.

5. A method according to claim 1, wherein enforcing the policy includes:
   measuring a distance between the impact summary and the template; and
   enforcing the policy if the distance is less than the threshold distance.

6. A method according to claim 5, wherein measuring a distance includes using a Hausdorff distance function to measure the distance between the impact summary and the template.

7. A method according to claim 1, wherein enforcing the policy includes:
   measuring a distance between the template including the first and second vectors, and the impact summary including the third and fourth vectors; and
   enforcing the policy if the distance is less than the threshold distance.

8. A computer-readable medium containing a program operable on a computer to enforce policy over a computer network, the program comprising:
   selection software to select a dictionary, the dictionary including a plurality of concepts organized as a directed set, exactly one concept identified as a maximal element, and for each concept in the directed set, at least one chain connecting the maximal element to the concept;
   selection software to select a set of chains to form a basis spanning a topological vector space;
   selection software to select at least one concept in the dictionary;
   creation software to create a state vector in the topological vector space for each of the selected concepts, wherein each state vector includes as its components measures of how concretely the concept is represented in each chain in the basis;
   definition software to define a template, the template including a first subset of state vectors including at least first and second vectors in the topological vector space, the topological vector space including at least one state vector not in the template;
   assignment software to assign a policy to the computer network;
   monitoring software to monitor a portion of a content stream on the computer network to construct an impact summary including a second subset of the state vectors including at least third and fourth vectors in the topological vector space;
   extrapolation software to extrapolate how close the entire content stream is to the template from the portion of the content stream using the impact summary and the template; and
   enforcement software to enforce the policy when the impact summary is within a threshold distance of the template.

9. A program according to claim 8, wherein the assignment software includes assignment software to assign a policy to limit bandwidth on the computer network for content in the content stream within the threshold distance of the template.

10. A program according to claim 8, wherein the assignment software includes assignment software to assign a policy to limit access to a document on the computer network within the threshold distance of the template.

11. A program according to claim 8, wherein the monitoring software includes monitoring software to monitor metadata of the content stream.

12. A program according to claim 8, wherein the enforcement software includes:
measurement software to measure a distance between the impact summary and the template; and
enforcement software to enforce the policy if the distance is less than the threshold distance.

13. A program according to claim 12, wherein the measurement software includes measurement software to use a Hausdorff distance function to measure the distance between the impact summary and the template.

14. A program according to claim 8, wherein the enforcement software includes:
measurement software to measure a distance between the template including the first and second vectors, and the impact summary including the third and fourth vectors; and
enforcement software to enforce the policy if the distance is less than the threshold distance.

15. An apparatus for enforcing policy over a computer network, the apparatus comprising:
a computer;
a directed set stored in the computer including a plurality of concepts, exactly one concept identified as a maximal element, and for each concept in the directed set, at least one chain extending from the maximal element to the concept;
a basis spanning a topological vector space including a subset of the plurality of chains;
for at least one concept in the directed set, a state vector in the topological vector space, wherein each state vector includes at least one measure of how concretely the concept is represented in each chain in the basis;
a template stored in the computer, the template including a first subset of the state vectors including at least first and second vectors in the topological vector space, the topological vector space including at least one state vector not in the template;
a policy associated with the template;
a monitor installed in the computer adapted to monitor a portion of a content stream in the computer network to construct an impact summary, the impact summary including a second subset of the state vectors including third and fourth vectors in the topological vector space;
a means for extrapolating how close the entire content stream is to the template using the impact summary and the template; and
a policy enforcer adapted to enforce the policy when the monitor determines the impact summary to be within a threshold distance of the template.

16. An apparatus according to claim 15, wherein the monitor is adapted to monitor metadata about the content stream.

17. An apparatus according to claim 16, wherein the metadata about the portion of the content stream includes a percentage of the network dedicated to the portion of the content stream.

18. An apparatus according to claim 15, wherein:
the policy enforcer includes a distance measurer to measure a distance between the impact summary and the template; and
the policy enforcer is adapted to enforce the policy if the distance is less than the threshold distance.

19. An apparatus according to claim 18, wherein the distance measurer includes a Hausdorff distance measurer to use a Hausdorff distance function to measure the distance between the impact summary and the template.

20. An apparatus according to claim 15, wherein:
the policy enforcer includes a distance measurer to measure a distance between the template including the first and second vectors, and the impact summary including the third and fourth vectors; and
the policy enforcer is adapted to enforce the policy if the distance is less than the threshold distance.

* * * * *